(12) United States Patent
Lages et al.

(10) Patent No.: US 9,168,559 B2
(45) Date of Patent: Oct. 27, 2015

(54) FACILITY AND METHOD FOR COATING THE INSIDE OF A PIPE ELEMENT

(75) Inventors: Victoria Lages, Pont a Mousson (FR); Yann Monnin, Pantin (FR); José De Sousa, Norroy lés Pont a Mousson (FR); Jean Garrant, Maidiéres (FR)

(73) Assignee: Saint-Gobain Pam, Nancy (FR)

( * ) Notice: Subject to any disclaimer, the term of this patent is extended or adjusted under 35 U.S.C. 154(b) by 0 days.

(21) Appl. No.: 13/638,913

(22) PCT Filed: Apr. 1, 2011

(86) PCT No.: PCT/FR2011/050738
§ 371 (c)(1),
(2), (4) Date: Jan. 4, 2013

(87) PCT Pub. No.: WO2011/121253
PCT Pub. Date: Oct. 6, 2011

(65) Prior Publication Data
US 2013/0108787 A1    May 2, 2013

(30) Foreign Application Priority Data

Apr. 2, 2010  (FR) ...................................... 10 52510
Apr. 2, 2010  (FR) ...................................... 10 52511

(51) Int. Cl.
*B05C 11/00*   (2006.01)
*B05D 7/22*    (2006.01)
(Continued)

(52) U.S. Cl.
CPC . *B05C 11/00* (2013.01); *B01F 7/08* (2013.01); *B05B 13/0636* (2013.01); *B05C 7/02* (2013.01);
(Continued)

(58) Field of Classification Search
CPC ............ B05C 7/02; B05D 7/22; B28B 19/00; B29C 47/10; F16L 9/04; F16L 57/06; F16L 58/06; B28C 5/14; B01F 7/08; B05B 13/06
USPC ................... 427/230–239; 118/317, DIG. 10, 118/DIG. 13
See application file for complete search history.

(56) References Cited

U.S. PATENT DOCUMENTS 5,725,906 A * 3/1998 Allen ............................ 427/231
5,810,470 A * 9/1998 Garrant et al. .................... 366/8

FOREIGN PATENT DOCUMENTS

FR    2414952 A1   8/1979
FR    2500785 A1   9/1982
(Continued)

OTHER PUBLICATIONS

International Search Report for PCT/FR2011/050738 dated Nov. 28, 2011.

*Primary Examiner* — William Phillip Fletcher, III
(74) *Attorney, Agent, or Firm* — Thompson Coburn LLP

(57) ABSTRACT

A facility suitable for coating the inside of a pipe element with a mortar that comprises a transport device (32) for feeding dry matter of the mortar that includes a transport chamber (48) and a transport member (54) for transporting the dry matter arranged in the transport chamber, the transport chamber being provided with a dry matter inlet (50) and a dry matter outlet (52); a mixing and projection device (34) for mixing the dry matter with liquid matter to obtain the mortar having a mixing member (82) and a mixing chamber (74) wherein the mixing chamber has a dry matter inlet (76) fed by the dry matter outlet (52), a liquid matter inlet (78) and a mortar outlet (80).

33 Claims, 8 Drawing Sheets

(51) Int. Cl.
*B29C 47/10* (2006.01)
*F16L 9/04* (2006.01)
*F16L 57/06* (2006.01)
*B01F 7/08* (2006.01)
*B05B 13/06* (2006.01)
*B28B 19/00* (2006.01)
*B28C 5/14* (2006.01)
*F16L 58/06* (2006.01)
*B05C 7/02* (2006.01)
*B28C 5/00* (2006.01)
*B28C 7/16* (2006.01)

(52) U.S. Cl.
CPC .............. *B05D 7/22* (2013.01); *B28B 19/0023* (2013.01); *B28C 5/00* (2013.01); *B28C 5/142* (2013.01); *B28C 7/167* (2013.01); *B29C 47/10* (2013.01); *F16L 9/04* (2013.01); *F16L 57/06* (2013.01); *F16L 58/06* (2013.01)

(56) References Cited

FOREIGN PATENT DOCUMENTS

| | | |
|---|---|---|
| FR | 2707204 A1 | 1/1995 |
| GB | 2 098 264 A * | 11/1982 |
| JP | 59-015507 | 1/1984 |
| JP | 63-018213 | 2/1988 |
| JP | 0426300 | 3/1992 |
| WO | 95/01830 A1 | 1/1995 |

* cited by examiner

FACILITY AND METHOD FOR COATING THE INSIDE OF A PIPE ELEMENT

CROSS-REFERENCE TO RELATED APPLICATIONS

This application is a National Stage application of International Patent Application No. PCT/FR2011/050738, filed on Apr. 1, 2011 which is incorporated by reference herein in its entirety, which claims the benefit of French Application No. 10 52510 filed Apr. 2, 2010 and FR Application No. 10 52511 filed Apr. 2, 2010 which are both incorporated by reference herein in their entireties.

The present invention relates to a facility adapted for coating the inside of a pipe element using a mortar, comprising
 a feeding device which is suitable for feeding the dry matter of the mortar, the feeding device including a feeding chamber and a member for feeding the dry matter, arranged in the feeding chamber, the feeding chamber being provided with a dry matter inlet and a dry matter outlet.

Wastewater transport pipes are known in the state of the art.

These pipes comprise a basic body made of metal on the internal surface of which an internal lining is applied capable of withstanding water having a pH between 4 and 13. The linings generally used comprise a cement mortar.

A facility for producing such a pipe is described in document WO95/01830. The facility comprises a tube inside which the dry matter, consisting of cement and a mineral filler (sand), are mixed. A tubular element makes it possible to introduce water into the tube and a helical spring mixes the dry matter and the water, thereby forming a mortar. A projection deflector is placed at the end of the helical spring and distributes the wet mortar on the internal surface of the pipe.

The invention aims to propose a facility that makes it possible to improve the mixing of the components of the mortar and allows a controlled application of the mortar on the internal surface of the basic body of a pipe element such as a pipe or connector.

To that end, the invention relates to a facility of the aforementioned type, characterized in that it includes:
 a mixing device suitable for mixing the dry matter with liquid matter in order to obtain the mortar, said mixing device having a mixing member and a chamber for mixing the dry matter with the liquid matter, the mixing chamber having a dry matter inlet, a liquid matter inlet and a mortar outlet; and in that
 the dry matter outlet of the transport device leads into the dry matter inlet of the mixing chamber, and the feeding member and the mixing member are separate members.

According to other specific embodiments, the facility according to the invention includes one or more of the following features:
 the transport member defines an axis (A2) and the mixing member defines an axis (B2), and the transport member and the mixing member are axially spaced apart from one another and form an axial gap (EC);
 the transport member is a screw and/or the mixing member is a screw;
 the transport member is a screw and the mixing member is a screw, and the screws have different screw pitches (P1, P2) and/or outside diameters (D1, D2);
 the transport chamber defines a chamber axis (A1) and the mixing chamber defines a chamber axis (B1), and said chamber axes are arranged coaxially to one another;
 the transport chamber and the mixing chamber have different transverse cross-sections, and in particular the surface area of the transverse cross-section of the transport chamber is larger than the surface area of the transverse cross-section of the mixing chamber;
 a first drive motor suitable for driving the transport member and a second drive motor suitable for driving the mixing member;
 the transport member has a driving side and a free side, and the mixing member has a driving side and a free side, and the two free sides being adjacent to one another, and in particular the two free sides being oriented toward one another;
 a projection head adapted to project the mortar, the projection head having a head inlet, in which the mortar outlet emerges, and at least one projection window for the mortar;
 the projection head has a basic body in the shape of a hollow cylinder, in particular with a circular section, and extending along a head axis, the or each projection window having two non-parallel sides;
 the or each projection window is generally in the shape of a triangle or quadrilateral;
 the projection head includes at least two projection windows, each projection window having a wide portion and a thin portion, and the projection windows being arranged such that the thin and wide portions alternate in the circumferential direction of the projection head;
 the or each projection window is generally in the shape of an isosceles or equilateral triangle;
 the transport device is a mixing device that is suitable for mixing at least a first dry component and a second dry component;
 a device for feeding liquid matter suitable for introducing the liquid matter into the dry matter, in particular the device for feeding liquid matter including a device for introducing a first liquid component and a device for introducing a second liquid component; and
 the device for introducing the first liquid component and the device for introducing the second liquid component are adapted to introduce the first liquid component and the second liquid component separately from one another; and
 the or each device for introducing the liquid component being adapted to introduce the concerned liquid component into the dry matter in a direction having a component perpendicular to the transport direction (T) of the filler or in a direction perpendicular to that transport direction (T).

The invention also relates to a use of a facility as cited above to coat the inside of the basic body of a pipe element with a mortar lining.

The invention will be better understood upon reading the following description, provided solely as an example and done in reference to the appended drawings, in which.

Figure 5:
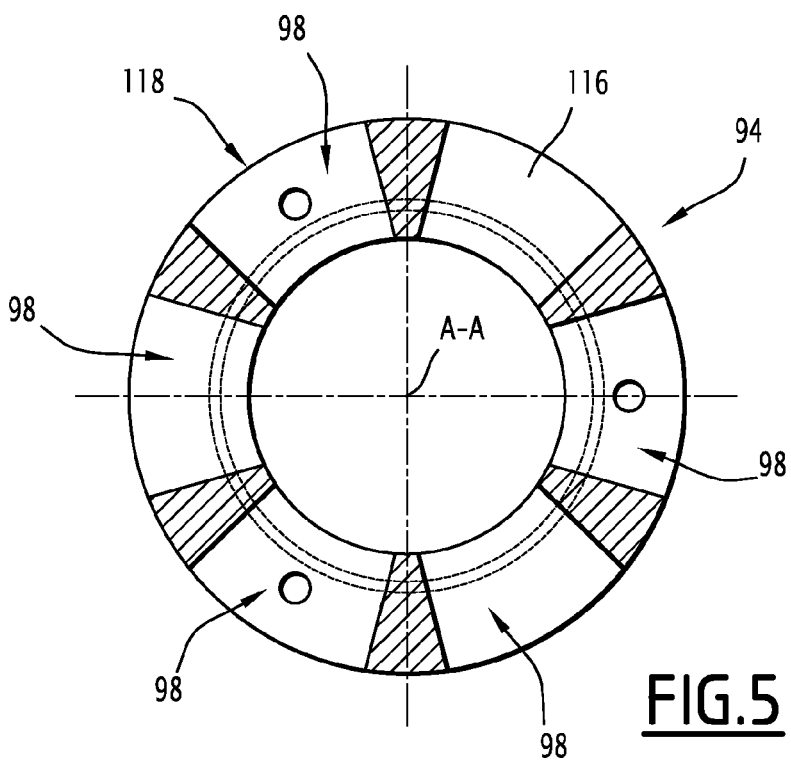
FIG. 5 is a transverse cross-sectional view of the projection head.
Figure 6:
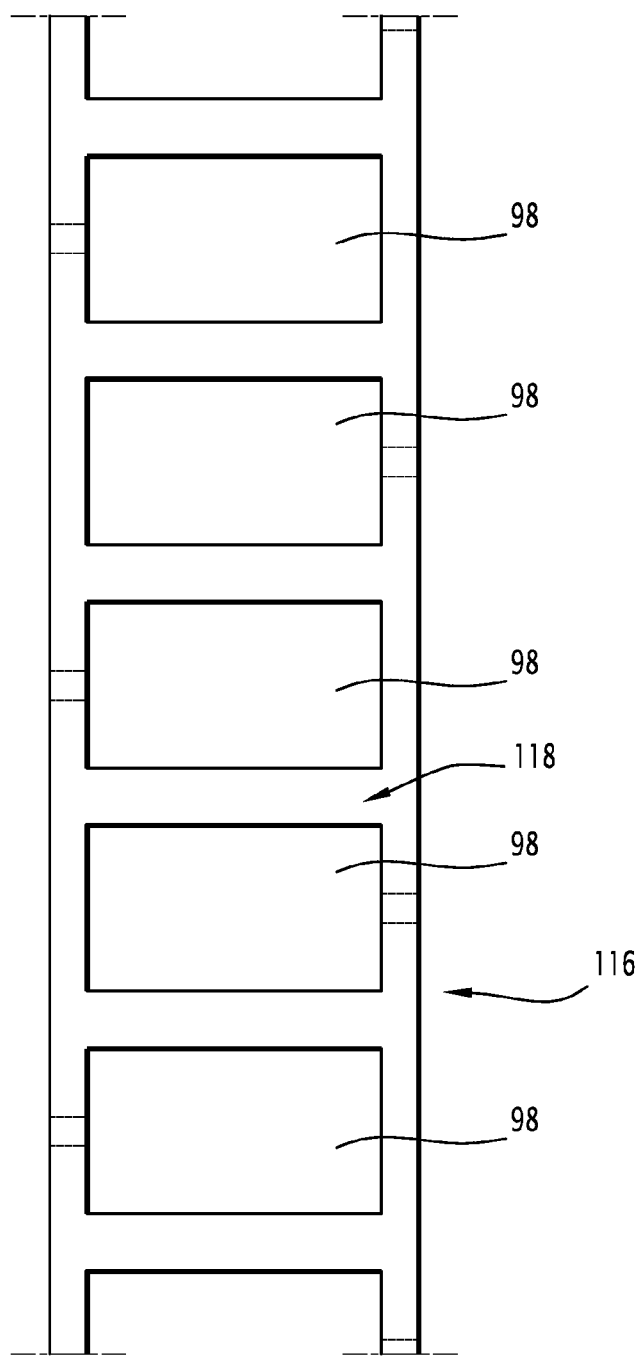
FIG. 6 is a developed view of the surface surrounding the projection head of FIG. 5.
Figure 8:
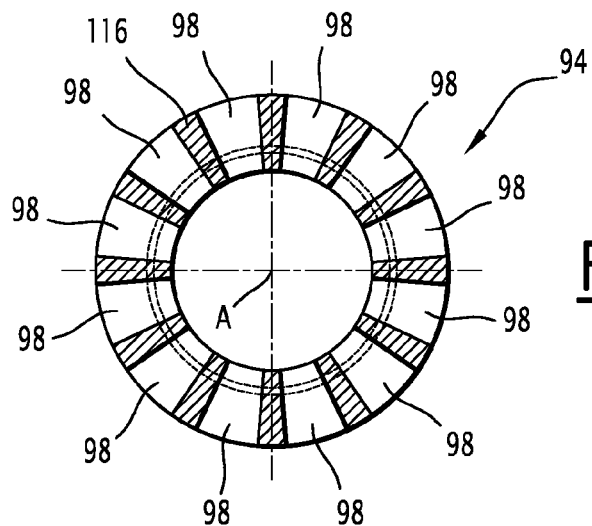
Figure 9:
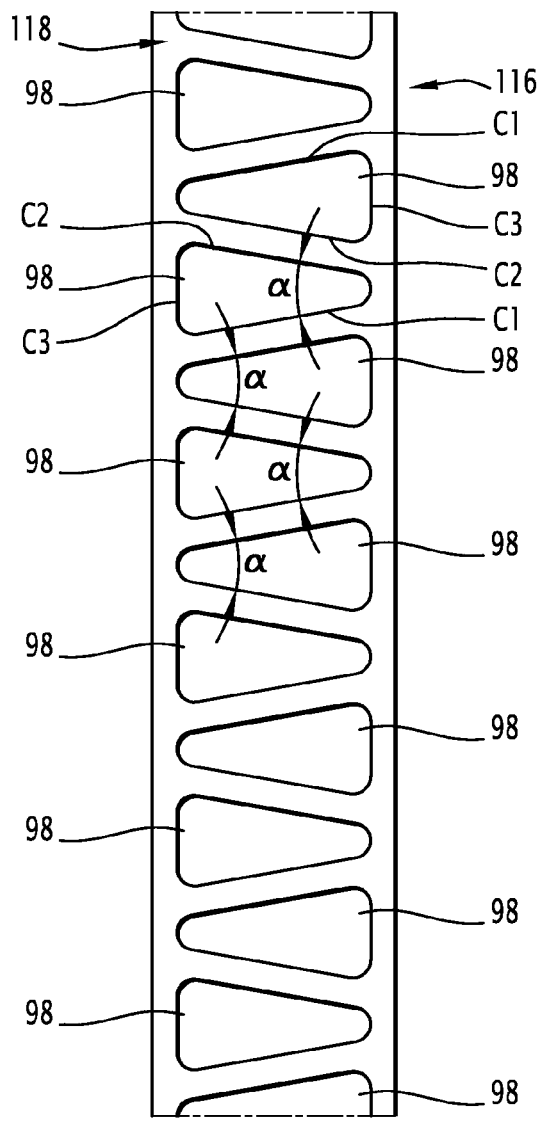
Figure 10:
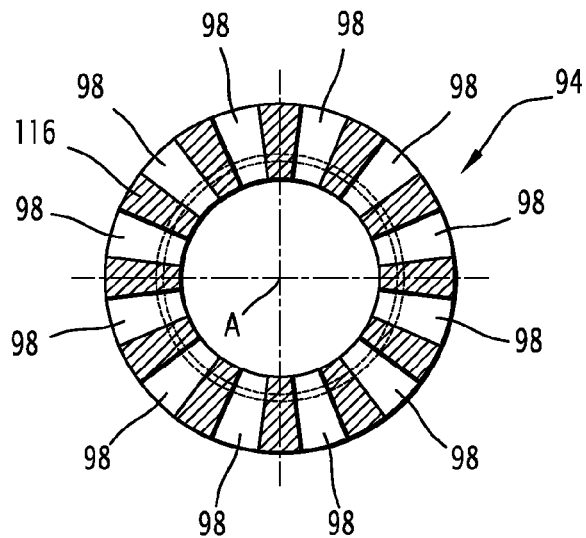
Figure 11:
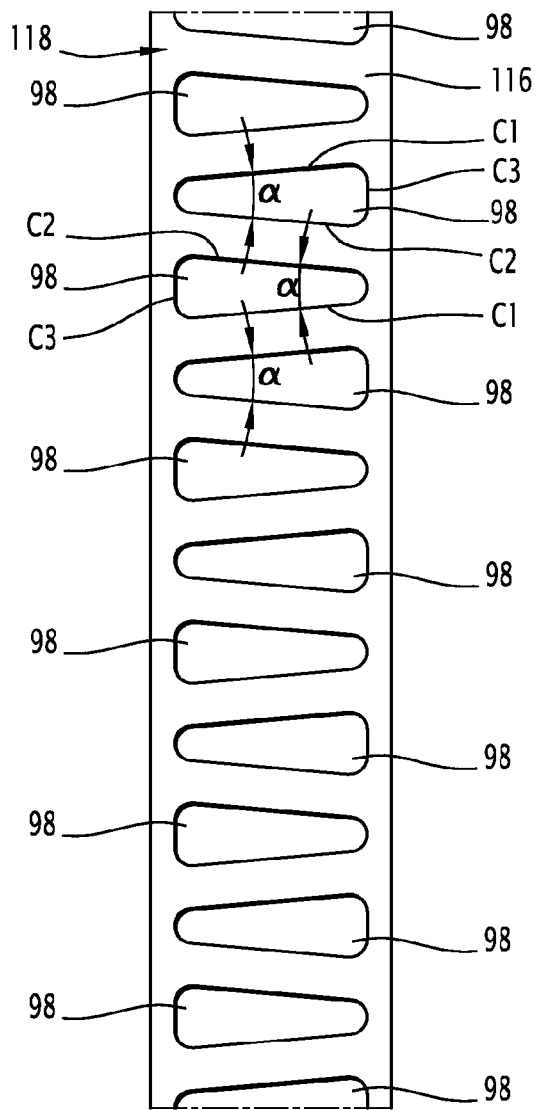

FIGS. 8 and 9 are views similar to those of FIGS. 5 and 6 of a third embodiment of the projection head; and FIGS. 10 and 11 are views similar to those of FIGS. 5 and 6 of a fourth embodiment of the projection head.

Figure 1:
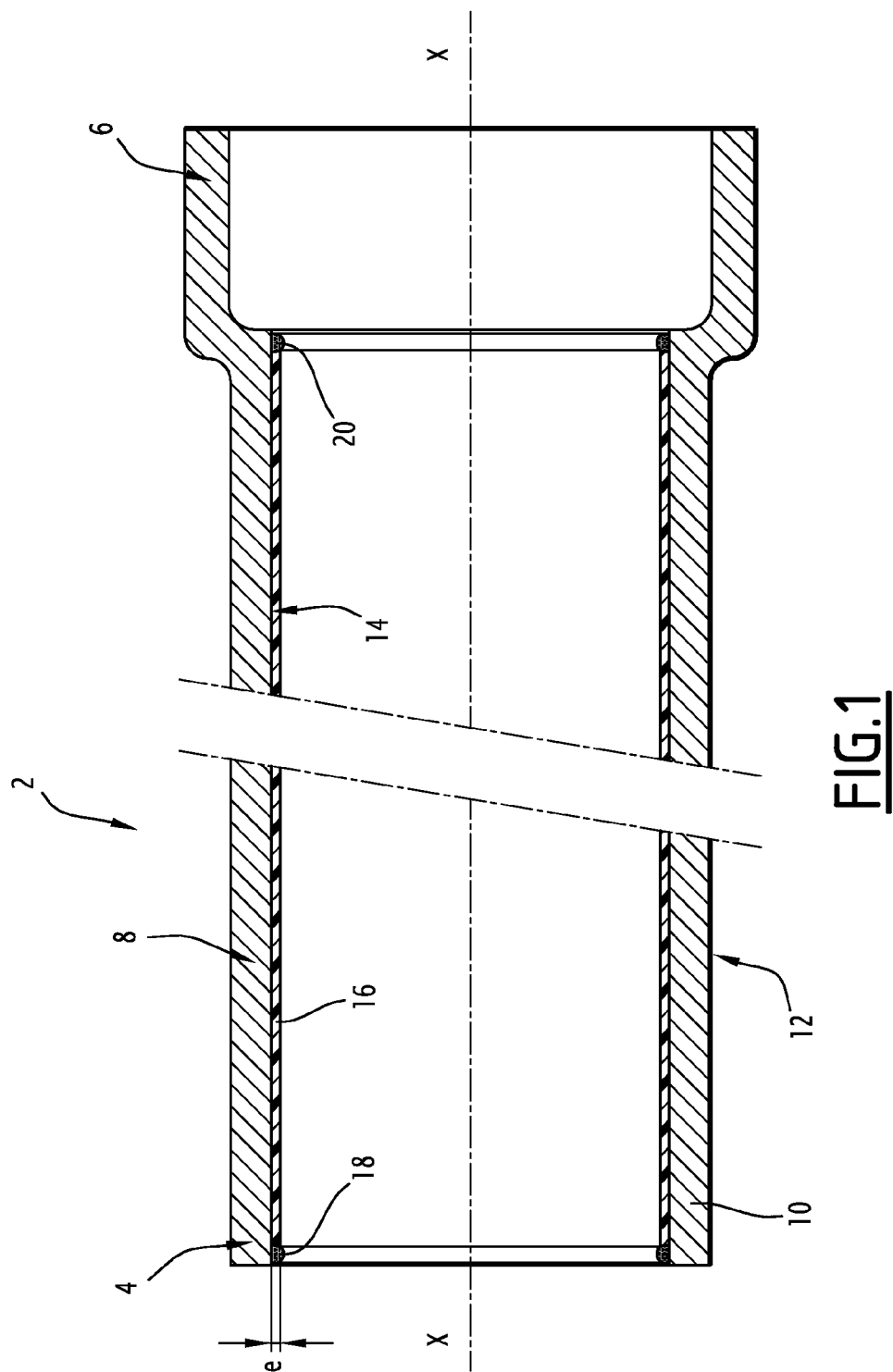
FIG. 1 is a longitudinal cross-section of a pipe manufactured using a facility according to the invention.

FIG. 1 shows a pipe that may be manufactured using the facility according to the invention, designated by general reference 2.

This pipe 2 extends along a central axis X-X. In the following and unless otherwise indicated, the terms "axially," "radially" and "circumferentially" will be used in relation to the central axis X-X.

The pipe 2 comprises a spigot end 4, an interlocking end 6, and an intermediate portion 8 extending between the spigot end 4 and the interlocking end 6.

The pipe 2 is provided with a basic body 10, for example made from cast iron, and in particular spherical-graphite cast iron. This basic body 10 defines an external basic body surface 12 and an the internal basic body surface 14.

The external surface 12 is lined with an external anticorrosion lining (not shown), for example zinc-based.

The pipe 2 also includes an internal lining 16 applied on the internal surface 14 of the intermediate portion 8 and the spigot end 4. The interlocking end 6 does not bear the internal lining 16.

The internal lining 16 preferably has a wall thickness e comprised between 2 mm and 10 mm, in particular over the entire expanse thereof.

The internal lining 16 is made from a material allowing the pipe 2 to convey wastewater having a pH comprised between 4 and 13, and which may periodically be below 4.

To that end, the internal lining 16 comprises a mortar and in particular consists of that mortar.

The pipe 2 also comprises a first stop 18 and a second stop 20 which, when the mortar is applied in the liquid or viscous state on the internal surface 14 of the basic body of the pipe 2, oppose the mortar flowing outside the parts to be coated.

The mortar for the internal lining 16 has a specific composition so that it is easy to apply while withstanding aggressive effluents. The mortar is either a hydraulic mortar, which may be reinforced by at least one additive and/or polymer and/or reinforcing fibers, or a resin mortar, potentially with the addition of at least one additive and/or reinforcing fibers.

The mortar is obtained from the mixture of dry matter and liquid matter.

The dry matter comprises at least one first dry component, and at least in the case of a hydraulic mortar, a second dry component. Alternatively, the dry matter comprises at least one third dry component.

The liquid matter comprises at least one first liquid component, and at least in the case of a resin mortar, a second liquid component. Alternatively, it may comprise additional liquid components.

In the case of a hydraulic mortar, the first dry component is a mineral filler, for example a sharp or waterworn sand. Preferably, the mineral filler is a silicate sand, sandlime, or a slag. The particle size of the sand is smaller than 4 mm.

The second dry component is a hydraulic binder, in particular a blast furnace cement, a high alumina cement, or a cement comprising a polymer.

The third dry component may be an additive of the superplasticizer, coloring agent, retarding agent, water retentive agent, or setting agent type.

In the case of a hydraulic mortar, the first liquid component is water. Advantageously, the liquid matter of the hydraulic mortar comprises a second liquid component, which may be a liquid additive of the superplasticizer, coloring agent, retarding agent, water retentive agent, or setting agent type.

Also, in the case of a hydraulic mortar, the second liquid component may be a polymer, such as aqueous phase latex, or an epoxide. In the latter case, a hardener forming a third liquid component is also used, and the epoxide and the hardener are then introduced into the dry matter separately.

In the case of a hydraulic mortar, the mass ratio between the first dry component, i.e. the sand, and the second dry component, i.e. the cement, is between 2 and 3.

The mass ratio between the first liquid component, i.e. the water, and the second dry component, i.e. the cement, is less than 0.45.

The hydraulic mortar according to the invention may also comprise reinforcing fibers of the organic, mineral, or metal type, in a weight proportion between 0.5% and 5% of the weight of the hydraulic binder. Preferably, the reinforcing fibers are then mixed with the mineral filler making up the first dry component before mixing thereof with the other dry matter.

In the case of a resin mortar, the latter is obtained by mixing a dry mineral filler and an organic binder. The dry matter thus consists of the dry mineral filler. The latter then comprises at least one first dry component, for example a sharp or waterworn sand. Preferably, the first dry component is a silicate sand, sandlime, or slag, the particle size of the sand being less than 4 mm. Preferably, the particle size of the first dry component is between 10 µm and 1 mm. In particular, the mineral filler may consist of the first dry component.

Advantageously, the dry mineral filler comprises a second dry component, for example consisting of a silicate sand or sandlime. In particular, the dry mineral filler consists of these two dry components.

Advantageously, these two dry components have different particle sizes. Preferably, the first dry component has a particle size smaller than 4 mm, and the second dry component has a particle size smaller than 0.4 mm. The term particle size is used in accordance with French standard XP P 18-545. The second dry component is therefore a more fine dry sand than the sand making up the first dry component.

Furthermore, the first dry component makes up between 60% and 90% by weight of the dry mineral filler, while the second dry component makes up between 40% and 10% by weight of the dry mineral filler.

The organic binder of the resin mortar advantageously comprises a polyepoxide resin, or consists of such a polyepoxide resin. This polyepoxide resin consists of an epoxide sub-component making up the first liquid component, and a hardening agent sub-component making up the second liquid component. Advantageously, the epoxide sub-component and the hardening agent sub-component have a weight ratio comprised between 100/30 and 100/60, preferably between 100/40 and 100/55.

Alternatively, the organic binder comprises a polyurethane resin, or consists of such a polyurethane resin, which consists of a polyol sub-component making up the first liquid component and an isocyanate sub-component making up the second liquid component.

Advantageously, the weight ratio between the mineral filler and the organic binder is either comprised between 4/1 and 7.5/1 or between 1.5/1 and 4/1, and preferably between 2/1 and 3/1.

Alternatively, the liquid matter for the resin mortar may comprise one or more additional liquid components of the coloring agent, diluent, or other type.

The resin mortar according to the invention may also comprise reinforcing fibers of the organic, mineral, or metal type, in a weight proportion comprised between 0.5% and 10% of the weight of the organic binder. The reinforcing fibers are then mixed with the dry mineral filler before mixing thereof with the organic binder.

Figure 2:
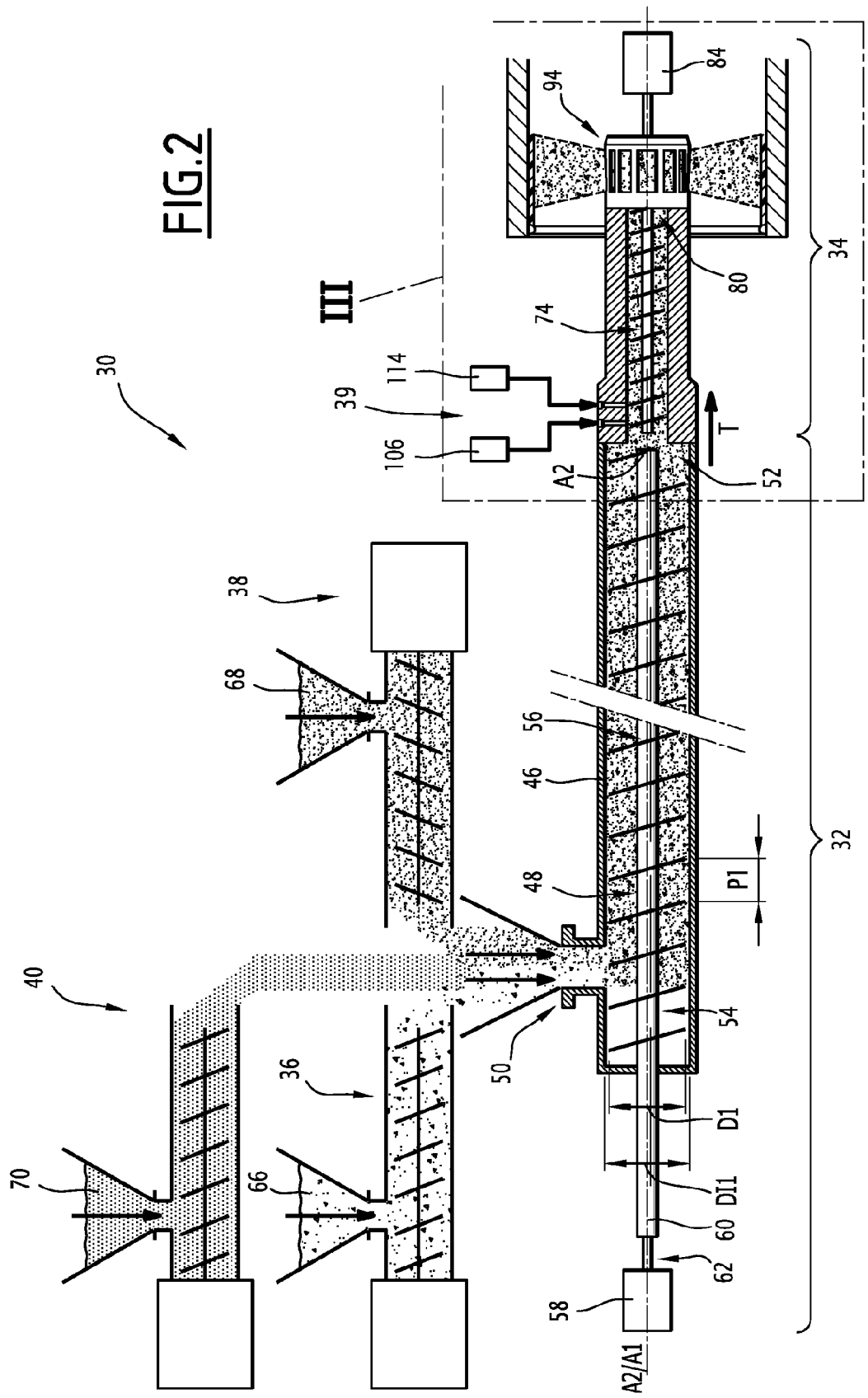
FIG. 2 is a diagrammatic view of a facility for coating a pipe according to the invention.
Figure 3:
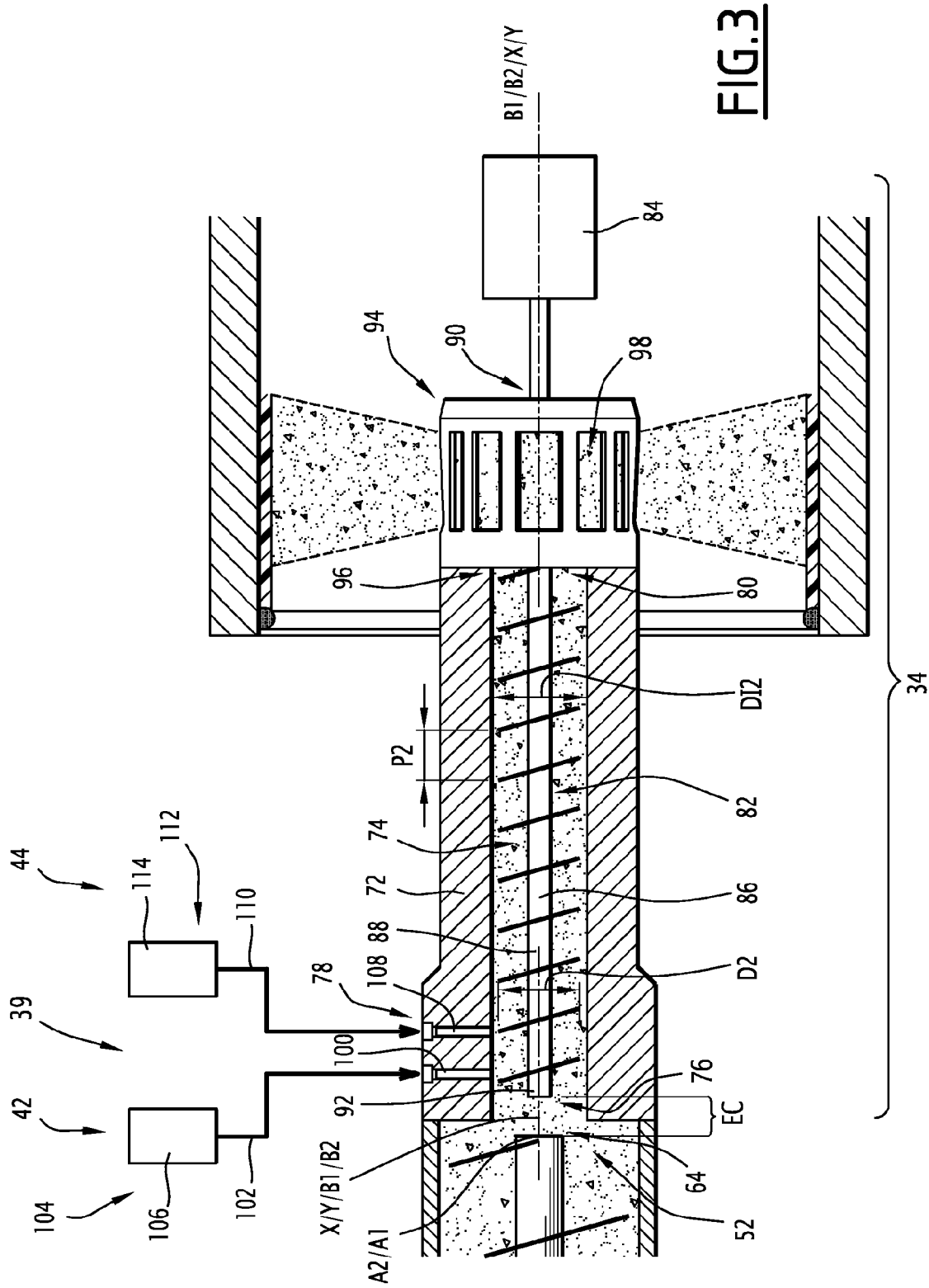
FIG. 3 is an enlarged view of detail III of FIG. 2.

FIG. 2 diagrammatically illustrates a facility 30 adapted to apply the internal lining 16 on the basic body 10 of the pipe 2 as described above.

The facility 30 comprises a transport device 32 adapted to transport the dry matter. The facility 30 also comprises a mixing and projection device 34. Furthermore, the facility 30 is provided with a first device 36 for introducing dry matter, a second device for introducing dry matter 38 and a third dry matter introduction device 40. The facility 30 is also provided with a device for feeding liquid matter 39. This device for feeding liquid matter 39 comprises first device for introducing liquid matter 42 and the second device for introducing liquid matter 44.

The transport device 32 is suitable for transporting the dry matter and is provided with a case 46 forming a transport chamber 48. The transport chamber 48 is provided with a dry matter inlet 50 and a dry matter outlet 52. The transport device 32 also comprises a dry matter transport member 54. In the case at hand, the transport device 32 is a screw conveyor, the transport member being a screw 56 arranged in the transport chamber 48. The transport device 32 also makes up a mixing device suitable for mixing the first dry component and the second dry component, and potentially the third dry component.

The first dry matter introduction device 36 is suitable for introducing the first dry component into the dry matter inlet 50. The second dry matter introduction device 38 is suitable for introducing the second dry component into the dry matter inlet 50. The third dry matter introduction device 40 is suitable for introducing the third dry component into the dry matter inlet 50.

The transport chamber 48 is a cylinder with a circular section having a transport chamber axis A1 and an internal diameter DI1. The transport chamber 48 therefore has a given transverse cross-section.

The transport device 32 includes a drive motor 58 suitable for driving the transport member 54.

The screw 56 includes a central shaft 60 extending along a shaft axis A2. The screw 56 includes a given screw pitch P1 and an outer diameter D1. The screw 56 has a driving side 62 associated with the drive motor 58 and a free side 64, opposite the driving side 62.

The first dry matter introduction device 36 is a screw regulator and includes an inlet reservoir 66 containing the first dry component. The second dry matter introduction device 38 is a screw regulator, and includes an inlet tank 68 containing the second dry component. The third dry matter introduction device 40 is a screw regulator and includes an inlet reservoir 70 containing the third dry component.

The mixing and projection device 34 is suitable for mixing the dry components and the liquid components. The mixing and projection device 34 is provided with a case 72 forming a mixing chamber 74. The mixing chamber 74 includes a dry matter inlet 76, a liquid matter inlet 78, and a mortar outlet 80. The dry matter inlet 76 is arranged downstream from the dry matter outlet 52 of the transport chamber 48, and said dry matter outlet 52 emerges in the dry matter inlet 76 of the mixing chamber 74. The liquid matter inlet 78 is connected to the liquid matter feed device 39 and is arranged close to and downstream from the dry matter inlet 76 in the mixing chamber 74.

The mixing and projection device 34 is also provided with a mixing member 82 arranged in the mixing chamber 74.

The mixing chamber 74 is cylindrical with a circular cross-section having a mixing chamber axis B1 and an inner diameter DI2. The mixing chamber 74 therefore has a given transverse cross-section.

The mixing and projection device 34 includes a drive motor 64 suitable for driving the mixing member 82.

The mixing member is a screw 86. The screw 86 includes a central shaft 88 extending along a shaft axis B2. The screw 86 includes a given screw pitch P2 and an outer diameter D2. The screw 86 has a driving side 90 associated with the drive motor 84 and a free side 92, opposite the driving side 90.

The transport device 54 is separate from the mixing member 82.

The screw pitch P1 is different from the screw pitch P2. Preferably, the screw pitch P1 is larger than the screw pitch P2.

The outer diameter D2 is different from the outer diameter D1. In the case at hand, the diameter D1 is larger than the diameter D2.

Furthermore, the screws 56, 86 are axially separate and do not overlap.

Furthermore, the free sides 64, 92 of the two screws are adjacent to one another.

More specifically, the screws 56, 86 are axially spaced apart from one another forming an axial gap EC. The axial gap is measured along the axes A2 and B2.

The transport chamber 48 and the mixing chamber 74 are arranged coaxially. In other words, the central axis B1 of the mixing chamber 74 is coaxial to the central axis A1 of the transport chamber 48.

The inner diameter DI1 is larger than the inner diameter DI2. The transverse cross-section of the transport chamber 48 is therefore larger than the transverse cross-section of the mixing chamber 74.

The mixing and projection device 34 includes a projection head 94 suitable for protecting the mortar on the internal surface of the pipe. The projection head 94 includes a head inlet 96 and at least one projection window 98. The mortar outlet 80 of the mixing chamber 74 emerges in the head inlet 96.

The mixing and projection device 34 defines a central axis Y-Y, which is the central axis of the mixing chamber 74. The mixing and projection device 34 also defines a transport direction T oriented parallel to the axis Y-Y and oriented from the dry matter inlet 76 toward the projection head 94.

The mixing and projection device 34 is provided with means for rotating the projection head 94 in relation to the case 72. Preferably, the projection head 94 and the transport and the mixing member 82 are secured in rotation. In this way, the projection head 94 and the mixing member 82 are driven by the same drive motor 84.

The first liquid matter introduction device 42 is suitable for introducing the first liquid component into the dry matter.

The first liquid matter introduction device 42 includes an introduction channel 100 emerging in the mixing chamber 74 at the liquid matter inlet 78. The introduction channel 100 emerges in the mixing chamber 74 at a location situated downstream of the dry matter inlet 76, considering the transport direction T. This introduction channel 100 passes through the wall of the case 72, and is preferably arranged radially in relation to the central axis Y-Y, such that the first liquid component is radially and perpendicularly introduced into the mixing chamber 74.

The first liquid matter introduction device 42 also includes a duct 102 and a regulator device 104. The regulator device 104 is connected by the duct 102 to the introduction channel 100. The regulator device 104 also includes a reservoir 106 containing the first liquid component.

The second liquid matter introduction device 44 is suitable for introducing the second liquid component into the dry matter.

The second liquid matter introduction device 44 includes an introduction channel 108 emerging in the mixing chamber 74. The introduction channel 108 emerges in the mixing chamber 74 at the liquid matter inlet 78 at a location situated downstream of the location where the introduction channel 100 for the first liquid component emerges in the mixing chamber 74, considering the transport direction T. This introduction channel 108 passes through the wall of the case 72, and is preferably arranged radially in relation to the central axis Y-Y, such that the second liquid component is introduced radially and perpendicularly into the mixing chamber 74.

The second liquid matter introduction device 44 also includes a duct 110 and a regulator device 112. The regulator device 112 is connected by the duct 110 to the introduction channel 108. The regulator device 112 also includes a reservoir 114 containing the second liquid component.

The introduction channel 100 and the duct 102 are separated over the entire length thereof from the introduction channel 108 and the duct 110.

In general, the liquid matter introduction devices 42, 44 are adapted to introduce the two liquid components separately from one another in the mixing chamber 74. To that end, the introduction chamber 100 emerges in the mixing chamber 74 spaced away from the introduction channel 108.

The mixing of the liquid components and the dry components is therefore done exclusively in the mixing chamber 74 and not upstream therefrom. Consequently, only the mixing chamber 74 must be cleaned when the facility 30 is stopped, which limits the loss of matter.

Figure 4:
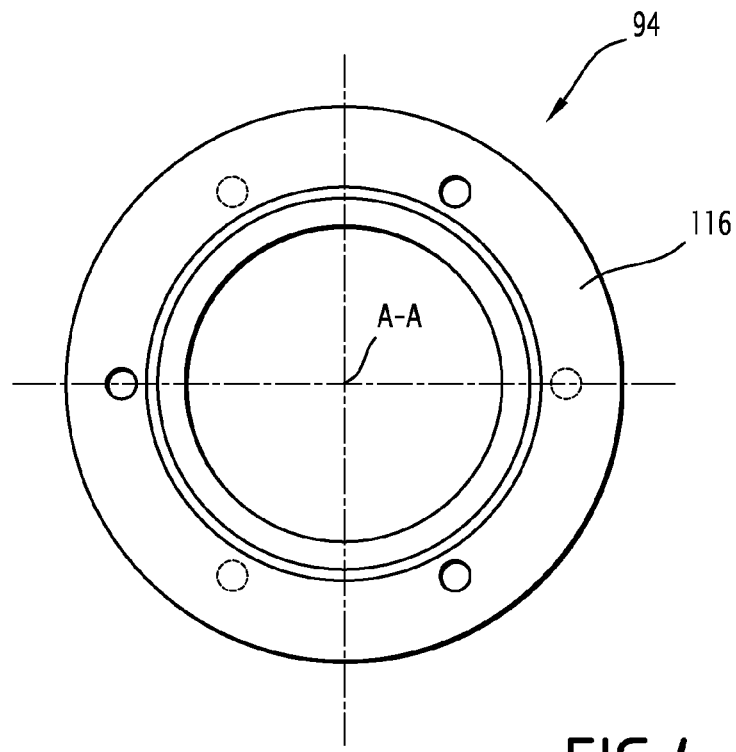
FIG. 4 is an axial view of the projection head of the facility of FIG. 2.

For the mortar to be able to be applied in a satisfactory manner over the internal surface of the pipe, the projection head 94 has a particular design. FIGS. 4 and 5 show one embodiment of that head 94.

As shown in FIGS. 4 and 5, the projection head 94 comprises a basic body 116. The basic body 116 is for example in the form of a hollow cylinder and extends along a central head axis A-A. The basic body 116 has an enclosure surface 118. The projection head 94 includes a multitude of projection windows 98 formed in the basic body 116. In the case at hand, the projection head 96 includes six projection windows 98. Each projection window 98 is a radial through opening of the basic body 116 in relation to the central head axis A-A.

FIG. 6 shows the enclosure surface 118 unwound in the plane of FIG. 6. Each projection window 98 has a substantially rectangular shape. Alternatively, each projection window 98 has a substantially triangular shape.

Figure 7:
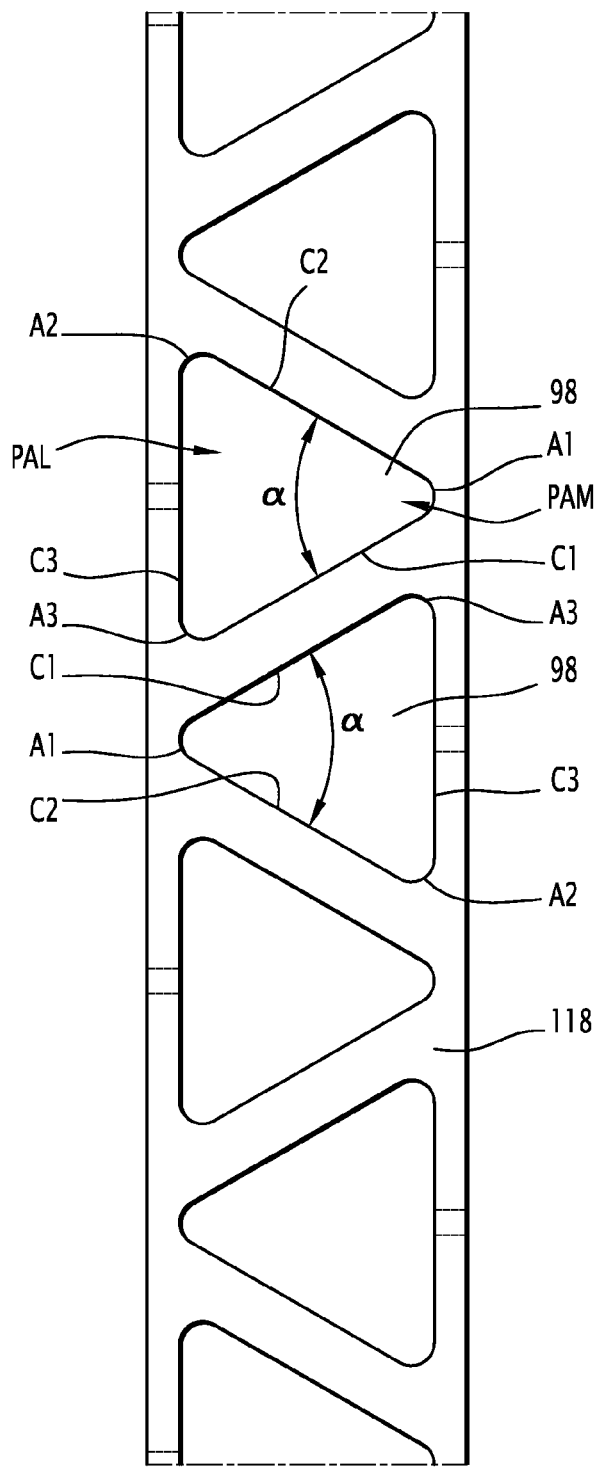
FIG. 7 is a view similar to FIG. 6, i.e. a developed view of the surface surrounding the projection head, according to a second embodiment.

FIG. 7 shows the enclosure surface 118, unwound in the plane of FIG. 7, of a projection head 94 according to a second embodiment, the projection head including six projection windows 98. Each projection window 98 has a substantially triangular shape with rounded corners. Each projection window 98 has three sides C1, C2, C3. Each time, two sides C1-C2, C2-C3 and C3-C1 are connected by an arc of circle portion A1, A2, A3. Each projection window 98 includes a wide axial portion PAL and a thin axial portion PAM. The wide axial portion PAL is circumferentially wider than the thin axial portion PAM in relation to the axis A-A.

The projection windows 98 are arranged around a central axis A-A such that the wide axial portions PAL and the thin axial portions PAM alternate in the circumferential direction around the central head axis A-A.

Each projection window 98 therefore forms a base, consisting of the wide axial portion PAL, and an apex, consisting of the thin axial portion PAM. The sides C1, C2 associated with the apex form an apical angle α between them. This apical angle α is comprised between 5° and 60°. In the example shown in FIG. 7, the apical angle α is 60°, and the projection windows 98 are in the shape of an equilateral triangle.

FIGS. 8 and 9 show a third embodiment of a projection head 94. The difference in relation to the second embodiment is the number of projection windows 98, of which there are twelve in this case. Furthermore, the apical angle α is 20° and the projection windows 98 are in the general shape of an isosceles triangle.

FIGS. 10 and 11 show a fourth embodiment of the projection head 94. The only difference in relation to the third embodiment is the apical angle α, which here is 10°.

In general, the projection windows 98 have at least two non-parallel sides. Alternatively, each projection window 98 may also be in the general shape of a quadrilateral, for example a trapezoid.

Hereafter, a method will be described for applying an internal lining 16 on the basic body 10 of the pipe according to the invention using the facility 30 of FIG. 2.

During a first step, the first dry component and the second dry component are introduced separately into the dry matter inlet 50 of the transport chamber 48. The two filler dry components are mixed and transported by the transport device 32 toward the dry matter outlet 52. Thus, a homogenous dry mixture is obtained at the outlet 52. The third dry matter introduction device may introduce another dry component into the dry matter inlet 50.

The dry matter is then introduced into the dry matter inlet 76 of the mixing and projection device 34 and is transported by the screw 86 in the transport direction T, the screw 86 and the projection head 94 being rotated simultaneously and synchronously by the drive motor 84.

During a second step, the first liquid component and, if applicable, the second liquid component are radially and perpendicularly introduced in relation to the transport direction T into the dry matter inlet 78, and thus into the dry matter, inside the mixing chamber 74. This introduction of the first liquid component into the dry matter is done separately from the introduction of the second liquid component into the dry matter. Alternatively, the introduction is done in a direction having a component radial or perpendicular to the transport direction T, but is not strictly radial or perpendicular. In that case, the channels 100 and 108 are inclined in relation to the transport direction T and the axis B1.

During a third step, the liquid components and the dry components are mixed by the screw 86 in the mixing chamber 74 and form a homogenous mortar that is conveyed in the projection head 94. The projection head 94 being rotated by the motor 84, the mortar is then projected on the internal surface of the pipe 2 through the projection windows 98.

During the projection, the pipe 2 is rotated around its axis X-X in a direction of rotation identical to that of the projection head, but at a slower speed of rotation than that of the projection head, and the projection head 94 is moved axially inside and along the pipe 2.

Once the entire portion of the internal surface 14 to be lined is covered with the mortar and while the latter is in a liquid or viscous state, the speed of rotation of the pipe 2 around its axis X-X is increased so as to smooth the free surface of the mortar lining 16. The acceleration produced during the increase in the speed of rotation of the pipe is between 50 and 100 times the normal acceleration of the Earth's gravity.

Alternatively, the liquid matter feed device has only a single liquid component introduction device, for example in the case of a hydraulic mortar without a liquid additive.

Also alternatively, the facility 30 may also be provided with additional dry matter introduction devices if other dry components must be introduced into the transport chamber 48; preferably, the facility 30 is provided with a separate dry matter introduction device for each dry component suitable for introducing the dry component into the dry matter inlet 50.

Likewise, the facility 30 may also be provided with additional liquid matter introduction devices when other liquid components must be introduced into the mixing chamber 74. Preferably, the facility 30 is provided with as many liquid matter introduction devices as there are liquid components to be introduced into the mixing chamber 74. In general, the liquid matter introduction devices are adapted to introduce the liquid components into the mixing chamber 74 separately from one another, and to that end have introduction channels that emerge in the mixing chamber 74 at locations spaced apart from one another. Furthermore, each liquid component introduction channel preferably emerges radially in the mixing chamber 74.

The characteristics of the projection head 42 described in reference to FIGS. 4 to 11 may be used individually or in any combination thereof. They may also be used with another facility suitable for coating a pipe element.

The invention claimed is:

1. A facility adapted for coating the inside of a pipe element using a mortar formed with a dry matter and a liquid matter, the facility comprising:
   (a) a transport device (32) which is suitable for transporting the dry matter of the mortar, the transport device comprising a transport chamber (48) and a transport member (54), which is arranged in the transport chamber, the transport chamber (48) being provided with a dry matter inlet (50) and a dry matter outlet (52), wherein the transport member transports the dry matter from the dry matter inlet to the dry matter outlet in a transport direction (T);
   (b) a mixing and projection device (34) suitable for mixing the dry matter with the liquid matter to obtain the mortar, said mixing and projection device comprising:
      (i) a case (72) forming a mixing chamber (74) having a dry matter inlet (76), a liquid matter inlet (78) and a mortar outlet (80), wherein the dry matter outlet (52) of the transport device (32) leads into the dry matter inlet (76) of the mixing chamber (74);
      (ii) a mixing member (82), which is arranged in the mixing chamber (74), that mixes the dry matter and the introduced liquid matter to obtain the mortar and transports mortar to the mortar outlet, wherein the transport member (54) and the mixing member (82) are separate members; and
      (iii) a projection head (94), comprising a head inlet, in which the mortar outlet (80) emerges, and at least one projection window (98) through which the mortar exits the facility and is projected to the inside of the pipe element; and
   (c) a device for feeding liquid matter (39) that comprises a first liquid matter introduction device (42) adapted for introducing the liquid matter or a first liquid component of the liquid matter into the dry matter at the liquid matter inlet in a direction that either has a component perpendicular to, or is perpendicular to, the transport direction of the dry matter (T), wherein the first liquid matter introduction device (42) comprises an introduction channel (100) emerging in the mixing chamber (74) at the liquid matter inlet (78) and passing through the case (72).

2. The facility according to claim 1, wherein the transport member (54) defines an axis (A2) and the mixing member (82) defines an axis (B2), and the transport member (54) and the mixing member (82) are axially spaced apart from one another and form an axial gap (EC).

3. The facility according to claim 1, wherein the transport member is a screw (56), the mixing member is a screw (86), or both the transport member is a screw (56) and the mixing member is a screw (86).

4. The facility according to claim 3, wherein the screws (56, 86) have different screw pitches (P1, P2), different outside diameters (D1, D2), or both different screw pitches (P1, P2) and different outside diameters (D1, D2).

5. The facility according claim 1, wherein the transport chamber (48) defines a chamber axis (A1) and the mixing chamber (74) defines a chamber axis (B1), and said chamber axes are arranged coaxially to one another.

6. The facility according to claim 1, wherein the transport chamber (48) and the mixing chamber (74) have different transverse cross-sections.

7. The facility according to claim 6, wherein the surface area of the transverse cross-section of the transport chamber (48) is larger than the surface area of the transverse cross-section of the mixing chamber (74).

8. The facility according to claim 1, further comprising a first drive motor (58) suitable for driving the transport member (54) and a second drive motor (84) suitable for driving the mixing member (82).

9. The facility according to claim 1, wherein the transport member (54) has a driving side (62) and a free side (64), and the mixing member has a driving side (90) and a free side (92), and wherein the two free sides (64, 92) are adjacent to one another.

10. The facility according to claim 9, wherein the free side (64) of the transport member (54) and the free side (92) of the mixing member (82) are oriented toward one another.

11. The facility according to claim 1, wherein the projection head (94) has a basic body (116) in the shape of a hollow cylinder extending along a head axis, and wherein the or each projection window (98) has two non-parallel sides (C1, C2).

12. The facility according to claim 11, wherein the basic body (116) has a circular cross-section.

13. The facility according to claim 1, wherein the or each projection window (98) is generally in the shape of a triangle or quadrilateral.

14. The facility according to claim 13, wherein the projection head (94) includes at least two projection windows (98), each projection window having a wide portion (PAL) and a thin portion (PAM), and the projection windows being arranged such that the thin and wide portions alternate in the circumferential direction of the projection head.

15. The facility according to claim 13, wherein the or each projection window (94) is generally in the shape of an isosceles or equilateral triangle.

16. The facility according to claim 1, wherein the transport device (32) is suitable for mixing at least a first dry component and a second dry component.

17. The facility according to claim 1, wherein the device for supplying liquid matter (39) further comprises a second liquid matter introduction device (44) adapted for introducing a second liquid component of the liquid matter into the dry matter at the liquid matter inlet in a direction that either has a component perpendicular to, or is perpendicular to, the transport direction of the dry matter (T)), wherein the second liquid matter introduction device (44) comprises an introduction channel (108) emerging in the mixing chamber (74) at the liquid matter inlet (78) and passing through the case (72).

18. The facility according to claim 17, wherein the first liquid matter introduction device and the second liquid matter introduction device introduce the first liquid component and the second liquid component separately from one another.

19. A method of coating the inside of a pipe element using a mortar formed with a dry matter and a liquid matter using a facility (30), the method comprising:
   (a) transporting the dry matter with a transport device (32) of the facility, wherein the transport device comprises a transport chamber (48) and a transport member (54) arranged in the transport chamber, the transport chamber (48) being provided with a dry matter inlet (50) and a dry matter outlet (52), wherein the transport member transports the dry matter from the dry matter inlet to the dry matter outlet in a transport direction (T);
   (b) introducing the liquid matter (39) or a first liquid component of the liquid matter into the dry matter with a device for feeding liquid matter (39) of the facility, wherein the device for feeding liquid matter comprises a first liquid matter introduction device (42) adapted for introducing the liquid matter or the first liquid component of the liquid matter into the dry matter in a direction that either has a component perpendicular to, or is perpendicular to, the transport direction of the dry matter (T);
   (c) mixing the dry matter with the liquid matter with a mixing and projection device (34) of the facility to obtain the mortar and project the mortar to the inside of the pipe element, wherein the mixing and projection device comprises:
      (i) a case (72) forming a mixing chamber (74) having a dry matter inlet (76), a liquid matter inlet (78) at which the liquid matter or the first component of the liquid matter is introduced into the dry matter, and a mortar outlet (80), wherein the dry matter outlet (52) of the transport device (32) leads into the dry matter inlet (76) of the mixing chamber (74), and wherein the liquid matter is introduced into the mixing chamber in a direction having a component perpendicular to the transport direction of the dry matter (T);
      (ii) a mixing member (82) arranged in the mixing chamber (74), that mixes the dry matter and the introduced liquid matter to obtain the mortar and transports mortar to the mortar outlet, wherein the transport member (54) and the mixing member (82) are separate members; and
      (iii) a projection head (94) comprising a head inlet, in which the mortar outlet (80) emerges, and at least one projection window (98) through which the mortar exits the facility and is projected to the inside of the pipe element;
   wherein the first liquid matter introduction device (42) comprises an introduction channel (100) emerging in the mixing chamber (74) at the liquid matter inlet (78) and passing through the case (72).

20. The method of claim 19, wherein the transport member (54) defines an axis (A2) and the mixing member (82) defines an axis (B2), and the transport member (54) and the mixing member (82) are axially spaced apart from one another and form an axial gap (EC).

21. The method of claim 19, wherein the transport member is a screw (56), the mixing member is a screw (86), or both the transport member is a screw (56) and the mixing member is a screw (86).

22. The method of claim 21, wherein the screws (56, 58) have different screw pitches (P1, P2), different outside diameters (D1, D2), or both different screw pitches (P1, P2) and different outside diameters (D1, D2).

23. The method of claim 19, wherein the transport chamber (48) defines a chamber axis (A1) and the mixing chamber (74) defines a chamber axis (B1), and said chamber axes are arranged coaxially to one another.

24. The method of claim 19, wherein the transport chamber (48) and the mixing chamber (74) have different transverse cross-sections.

25. The method of claim 24, wherein the free side (64) of the transport member (54) and the free side (92) of the mixing member (82) are oriented toward one another.

26. The method of claim 19, wherein the facility further comprises a first drive motor (58) suitable for driving the transport member (54) and a second drive motor (84) suitable for driving the mixing member (82).

27. The method of claim 19, wherein the transport member (54) has a driving side (62) and a free side (64), and the mixing member has a driving side (90) and a free side (92), and wherein the two free sides (64, 92) are adjacent to one another.

28. The method of claim 19, wherein the projection head (94) has a basic body (116) in the shape of a hollow cylinder extending along a head axis, and wherein the or each projection window (98) has two non-parallel sides (C1, C2).

29. The method of claim 19, wherein the or each projection window (98) is generally in the shape of a triangle or quadrilateral.

30. The method of claim 29, wherein the projection head (94) includes at least two projection windows (98), each projection window having a wide portion (PAL) and a thin portion (PAM), and the projection windows being arranged such that the thin and wide portions alternate in the circumferential direction of the projection head.

31. The method of claim 29, wherein the or each projection window (94) is generally in the shape of an isosceles or equilateral triangle.

32. The method of claim 19, wherein the transport device (32) is suitable for mixing at least a first dry component and a second dry component.

33. The method of claim 19, wherein the liquid matter further comprises a second liquid component and the device for supply liquid matter (39) further comprises a second liquid matter introduction device (44) adapted for introducing the second liquid component of the liquid matter into the dry matter at the liquid matter inlet in a direction that either has a component perpendicular to, or is perpendicular to, the transport direction of the dry matter (T), wherein the second liquid matter introduction device (44) comprises an introduction channel (108) emerging in the mixing chamber (74) at the liquid matter inlet (78) and passing through the case (72).

* * * * *